United States Patent [19]

Renshaw

[11] Patent Number: 5,685,201
[45] Date of Patent: Nov. 11, 1997

[54] ADJUSTABLE HANDLEBAR AND HANDLEBAR ASSEMBLY

[75] Inventor: Andrew Charles Renshaw, Macclesfield, United Kingdom

[73] Assignee: Renthal Limited, Cheshire, United Kingdom

[21] Appl. No.: 606,940

[22] Filed: Feb. 26, 1996

[30] Foreign Application Priority Data

Aug. 24, 1995 [GB] United Kingdom ............ 9 517 303

[51] Int. Cl.[6] ............................................. B62K 21/16
[52] U.S. Cl. ...................... 74/551.2; 74/551.4; 280/278
[58] Field of Search ........................ 74/551.2, 551.3, 74/551.4; 280/278, 287; 403/59, 83, 87

[56] References Cited

U.S. PATENT DOCUMENTS 556,398  3/1896  Blood et al. ................. 74/551.4
4,384,497  5/1983  Gatsos ........................ 74/551.4
5,193,834  3/1993  Strozyk ....................... 280/278

FOREIGN PATENT DOCUMENTS

| 072 688 | 2/1983 | European Pat. Off. . |
| 294395 | 7/1928 | United Kingdom . |
| 301636 | 12/1928 | United Kingdom . |
| 624942 | 6/1949 | United Kingdom . |
| 1138463 | 1/1969 | United Kingdom . |
| 2 073 113 | 10/1981 | United Kingdom . |

*Primary Examiner*—Richard M. Lorence
*Attorney, Agent, or Firm*—Oliff & Berridge

[57] ABSTRACT

Respective handlebar end pieces, including respective handgrip portions, are connected to opposing end regions of a central body which is formed of substantially parallel plates, usually, but not essentially, of metal.

This three part construction is more resistant to impact damage than a conventional one-piece handlebar, obviates the need for a brace, and allows for adjustment of the end pieces to meet the needs for individual riders.

14 Claims, 3 Drawing Sheets

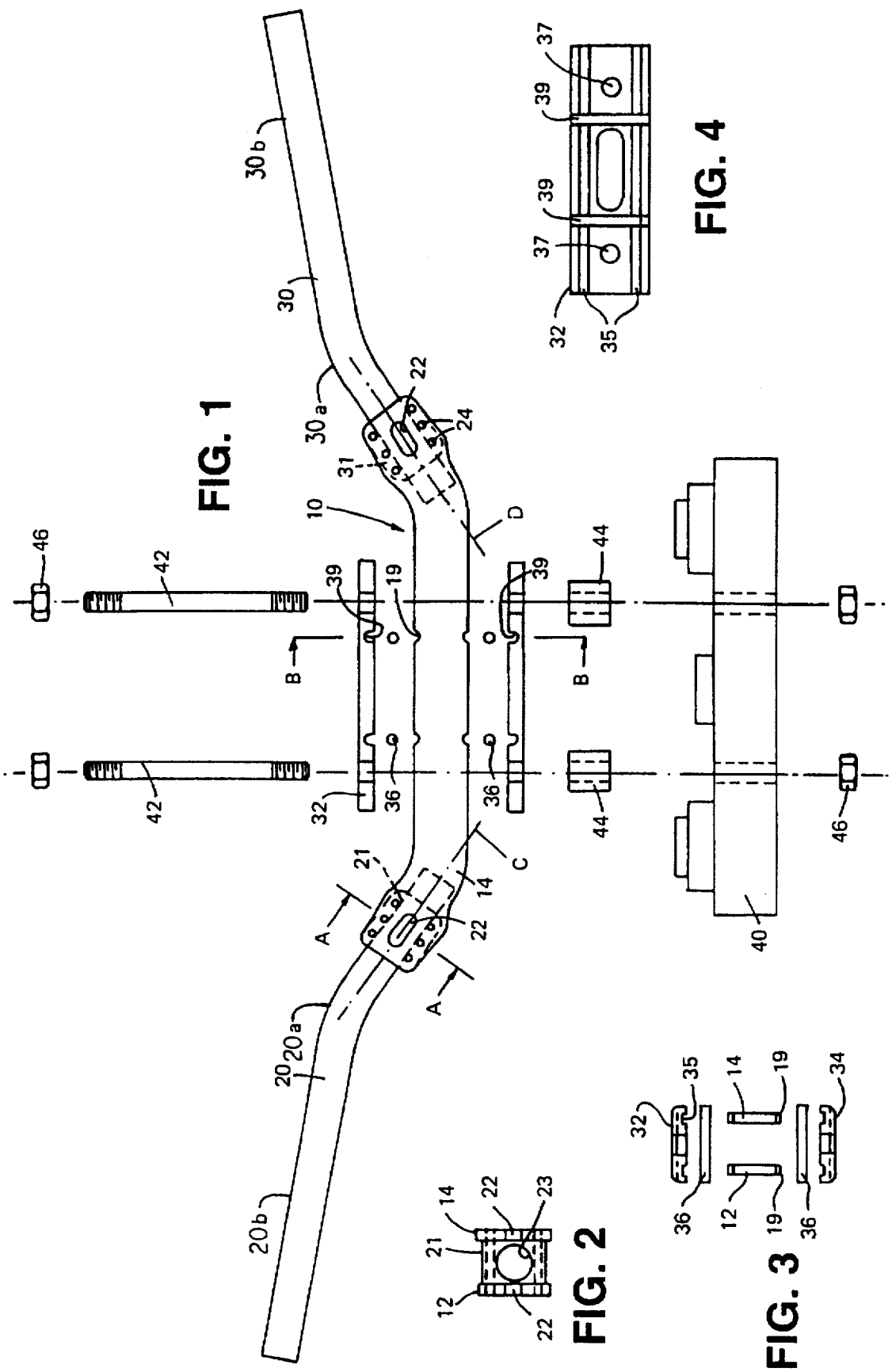

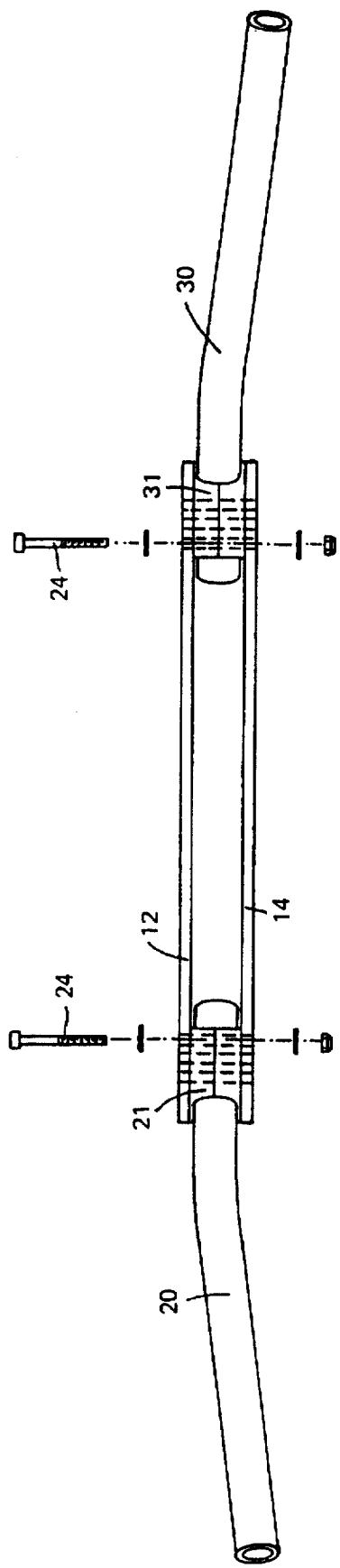
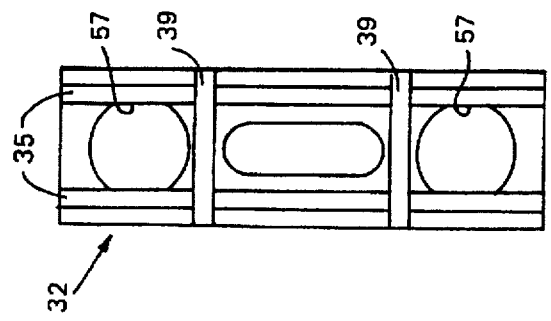
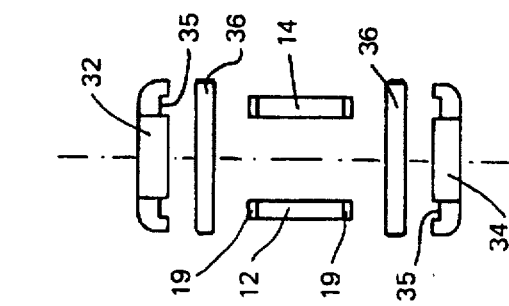

ADJUSTABLE HANDLEBAR AND HANDLEBAR ASSEMBLY

1. Field of the Invention

This invention concerns an adjustable handlebar and a handlebar assembly, which are particularly but not exclusively applicable to motorcycles.

2. Background to the Invention

Hitherto handlebars of motorcycles and cycles have comprised a single length of tube appropriately bent to provide both handgrip regions as well as a central connective region, the latter being clamped at one or two positions to form a connection to the main cycle frame via an intermediate top yoke or stem. For added strength it is conventional to provide a brace spanning the central region of the tube. An alternative to this is the provision of a tubular handlebar having a greater external diameter in its central region, said diameter reducing to the handgrip portions' of the tubing.

OBJECT OF THE INVENTION

An object of the present invention is to provide a different style of handlebar which would give rise to numerous advantages in manufacture and use and in particular would be far stronger than any known style of motorcycle or cycle handlebar in its resistance to impact damage, while obviating the need for a brace. A further object of the invention is to provide a handlebar which would allow for a wide range of adjustments and adaptations to suit individual riders. This would be especially applicable to competition use.

SUMMARY OF THE INVENTION

The present invention provides an adjustable handlebar comprising two end pieces, including respective hand grip portions, connected to opposing end regions of a central body which is formed of substantially parallel plates, usually, but not essentially of metal.

Preferably, the end pieces are tubular and are clamped between the respective end regions of the parallel plates forming the central body.

Although it is customary, and convenient, it is not imperative from a technical viewpoint, to form the handlebar from a single piece of tube. The three part construction now proposed, with the central body formed of parallel metal plates is, in fact, far more resistant to damage from impacts received from virtually all directions than hitherto single tube handlebars with (or without) a brace. The thickness of the plates as well as their other dimensions can be varied at the time of manufacture so as to provide handlebars of different strengths and different weights. The material used is preferably aluminium alloy and its composition may be varied to obtain a further variation in the properties of the handlebar.

Each end piece is advantageously mounted to the central body in such a way as to allow for adjustment of the position of the end piece along its own axis. In other words each end piece and hence each hand grip can be extended and retracted relative to the central body within a predetermined range. In the most common arrangement wherein the end pieces extend obliquely upwards and outwards from the central body of the handlebar, the height and width of the bar can be adjusted simultaneously by such axial adjustment of the end pieces.

Additionally or alternatively each end piece is preferably mounted to the central body in a manner which allows rotation of the end piece and the hand grip portion about its own axis.

In most practical embodiments the end pieces will be angular, comprising distal portions (which consist of the hand grip portions or include the hand grip portions at their extremities) which are bent at an oblique angle relative to proximal portions which are joined to the central body. In such cases, any rotatability will be about the axis of the proximal portions of the end pieces and such rotation would also change, to a slight extent, the overall height and width of the bar.

Additionally or alternatively the end pieces may be releasably attached to the central body so that end pieces of different length or different angularity may be substituted when required. This is applicable not only at the time of manufacture, but also during the lifetime of the bike, for example, if ownership or style of use changes, or even if asymmetric hand grips are desired to suit a particular race track. Such modifications by changing the endpieces are easier and more economical than changing the entire handlebar, as was the case with the prior art.

With the proposed design in its preferred form, with tubular end pieces and a central body formed of parallel plates, any impact damage which does occur should be confined to the end pieces which can readily be replaced at a much lower cost than repair or replacement of a conventional unitary handlebar.

In order to minimise the risk of one of the parallel plates of the central body sliding relative to the other upon impact from one end, thereby buckling the handlebar, at least one element is advantageously provided between the parallel plates, said element extending substantially perpendicular to the plates and projecting into recesses or openings formed in the plates. Elements such as a plurality of struts or pins may be convenient. It is not necessary that these are fixedly attached to the plates—although that is a possibility. What is important is that they should interengage the plates so as to form a bridge having sufficient rigidity to resist virtually any end to end movement of either plate relative to the other (i.e. resisting any parallelogram action).

The invention also provides a handlebar assembly comprising a handlebar as hereinbefore defined together with at least one clamping plate extending between the parallel plates forming the central body of the handlebar and together with a top yoke, to which the or each clamping plate is connectable, the yoke itself being adapted for connecting to a motorcycle or cycle frame.

The clamping plate(s) may constitute the abovementioned element(s) for prevent relative sliding of the parallel plates forming the central body. Alternatively, the clamping plate (s) may serve to hold in place pins or like elements which locate in notches in the edges of the body plates, the clamping plates themselves simply engaging over the edges of the plates forming the central body. As this implies, the clamping plate or plates need not be fixedly attached to the parallel plates of the central body.

The clamping plates are needed to provide apertures for bolting the handlebar to the top yoke. Spacers are provided between the lower of the plates and the yoke, and these may vary in size so that the height of the handlebar can be varied to suit individual riders.

In some embodiments springing and vibration damping means may be associated with fastening means for securing the handlebar, by way of the clamping plate(s), to the top yoke.

BRIEF DESCRIPTION OF THE DRAWINGS

The invention will be described further, by way of example, with reference to the accompanying drawings, in which:

FIG. 1 is a schematic, exploded rear view of a handlebar assembly according to the present invention;

FIG. 2 is a sectional view, along line A—A, showing a clamping block;

FIG. 3 is a sectional view along line B—B, showing side plates of the central body, pins and clamping plates;

FIG. 4 is an underside view of a clamping plate;

FIG. 5 is a plan view of the handlebar alone (i.e. without the clamping plates, yoke and fastening means);

FIGS. 6 and 7 are views corresponding to FIGS. 3 and 4, but to an enlarged scale and of a modified clamping plate;

DETAILED DESCRIPTION OF ILLUSTRATED EMBODIMENT

Figures 8A, 8B, 8C:
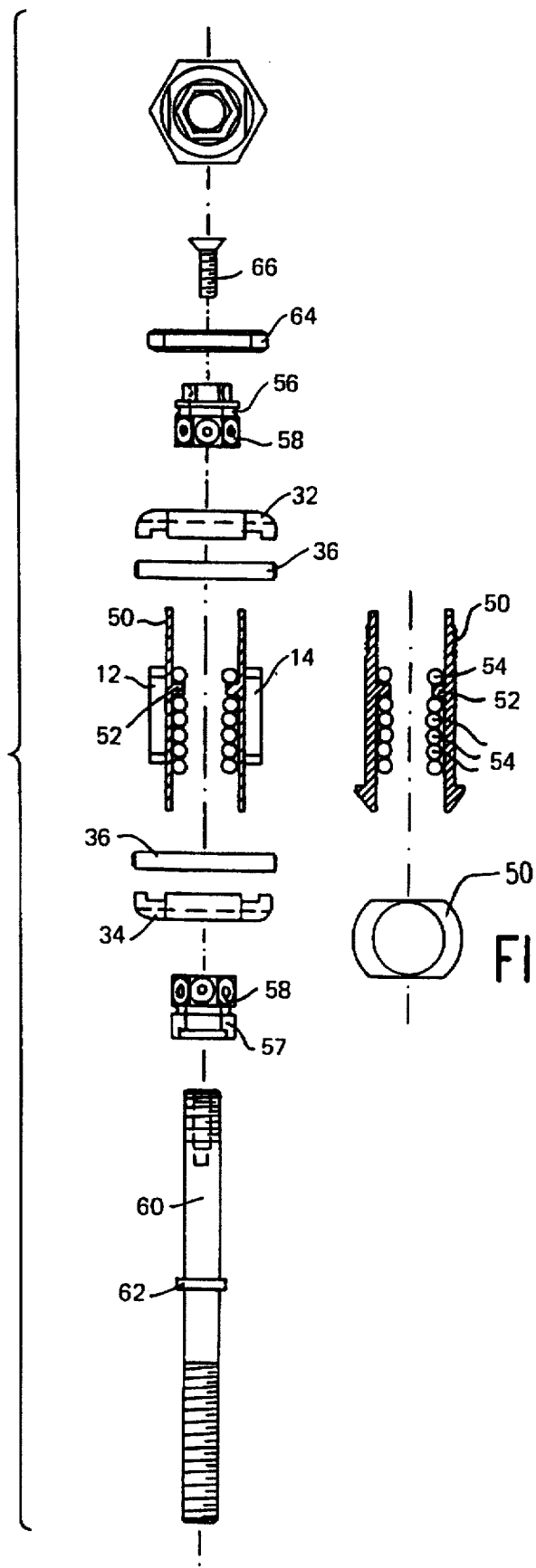
FIG. 8A is an enlarged scale exploded view of the components for fastening the handlebar shown in FIGS. 1 and 5 to the yoke in a modified version which includes springing and vibration damping means.
FIG. 8B is a sectional view of a cylindrical housing of the springing and vibration dampening means offset 90 degrees from the direction shown in FIG. 8A.
FIG. 8C is a plan view of the cylindrical housing.

Referring to FIGS. 1 and 5, the exemplary handlebar comprises a central body (10) and respective endpieces (20), (30) which are attached to respective ends of the body (10). The endpieces (20), (30), are of tubular metal, most suitably aluminium alloy. As shown, they are each bent at an oblique angle to provide proximal portions (20a, 30a) which are clamped to the central body (10) and distal portions (20b, 30b), remote from the central body (10). The longitudinal axes of the respective proximal portions (20a) and (30a) are indicated at C and D. The free end regions of the distal portions (20b), (30b) constitute the handgrip portions of the handlebar.

The central body (10) is formed of parallel plates (12), (14), most suitably of aluminium alloy, (about) 6 mm thick. Alternative materials are titanium steel, or carbon fibre. Other metals or composites could also be used. The plates (12), (14) are identical and each has end regions curved to one side in its plane. The handlebar is intended to be mounted onto the motorcycle frame via a top yoke (40) such that the plates (12), (14) lie generally one in front of the other with their end regions curving upwardly and the end pieces (20), (30) extending upwardly and outwardly from these end regions, as illustrated in FIG. 1.

The end pieces (20), (30) are clamped between the respective end regions of the plates (12), (14) by way of respective clamping blocks (21), (31). As shown in FIG. 2 these blocks (21), (31) are formed as two matching halves which together define a central bore (23) through which the proximal portion a of the respective end piece (20), (30) extends. Each half block has an oblong lug (22) formed on its rear surface which keys into a corresponding slot in the end region of the respective plate (12), (14). A set of six bolts (24) locating through corresponding apertures in the plates (12), (14) and the clamping blocks (21), (31) completes the security of the clamping arrangement at each end of the body (10). For clarity only one such bolt (24) is shown at each end in FIG. 5. Naturally the number of bolts used may vary in modified designs of the handlebar. By releasing the bolts (24) and allowing the clamping blocks (21), (31) to open the endpieces (20), (30) may be rotatably adjusted about the axes C, D of their respective proximal portions, or longitudinally adjusted along said axes, or, when required, completely removed and replaced.

The overall assembly also includes clamping plates (32), (34), pins (36) and the top yoke (40) as well as bolts (42) for fastening the clamping plates (32), (34) to the top yoke (40) and spacers (44) arranged between the lowermost clamping plate (34) and the top yoke (40). These are shown in FIG. 1, and all are suitably fabricated from aluminium alloy (or the other materials mentioned previously).

The clamping plates (32), (34), locate on the top and bottom of the plates (12), (14) constituting the central body (10) to form, in effect, a box section in the central region thereof. In this respect grooves (35) extending adjacent the opposing longer edges of each plate (32), (34) fit over the edges of the respective plates (12), (14). These grooves (35) are apparent in FIGS. 3, 4, 6 and 7. The clamping plates serve two functions. Primarily they provide means for attaching the handlebar onto the top yoke (40), which in turn connects to the main frame of the motorcycle. Such means takes the form of a pair of apertures (37) through which the bolts (42) extend, with nuts (46) being provided at each end of each bolt.

Additionally the clamping plates (32), (34) serve to hold in position the pins (36), of which two pairs are provided. The pins (36) are arranged perpendicularly between the plates (12), (14) and their ends locate in corresponding notches (19) formed in the edges of these plates. Comparable notches (39) formed in the underside of each clamping plate (32), (34) fit over the pins (36). These pins (36) are the elements referred to in the introduction which serve to link the plates (12), (14) of the central body together and substantially eliminate the possibility of one plate (12), (14) sliding relative to the other in the event of impact from one end.

The spacers (44) take the form of bushes which loosely locate on the bolts (42). Spacers of different lengths may be used to vary the height of the handlebar on the motorcycle.

FIGS. 6 to 8C illustrate a modified arrangement for mounting the handlebar described above to the top yoke. The apertures in the clamping plates (32), (34), now designated by reference number (57), are much larger than in the first embodiment and a fastening assembly incorporating springing and vibration damping means extends therethrough, as shown in FIGS. 8A–8C. In other aspects, however, the construction of the handlebar is as already described and the same reference numbers are used for corresponding parts.

In this modified arrangement a respective cylindrical housing (50) extends through each of the enlarged apertures (57) in the clamping plates (32), (34). The housing (50) is shown in FIGS. 8A and 8B in two positions, one at 90° to the other. The housing has an internal annular ledge (52). As shown, five resilient rings (54) are stacked below the ledge (52) and one is located above the ledge. Above and below the rings respective annular bodies (56), (57) are located in the housing (50). These bodies (56), (57) carry a series of resilient material rings (58) in an array, like a bracelet, around their circumference. All the rings (54), (58) may suitably be formed of a nitrile compound or elastomeric or other soft polymeric material with the right physical springing and damping characteristics.

Overall the entire damping system gives a substantial degree of vibration isolation, springing and damping in an upward direction (from the cycle body to the handlebar) and a modest degree of springing and damping in a downward direction as well as fore and aft.

A shaft (60) which is screw threaded at both ends extends through the centre of the housing bore, though the lower body (57) through the rings (54) and into the upper body (56) with which it has a screw connection. This shaft (60) carries a ridge (62) which abuts the lower body (57) and thereby retains the entire damping assembly within the housing (50). Below the ridge (62) the shaft (60) extends through a spacer (44) and connects to the top yoke (40). At the top, the body (56) is secured to the top of the shaft (60) by a lock screw (66), and the housing (50) is secured to the upper of the clamping plates (32) by a wide nut (64).

The springing and damping characteristics are adjustable by rotation of the upper body (56) about its threaded connection to the shaft (60), the locking screw (66) still retaining the body (56) in position.

Naturally many variations to the illustrated vibration damping/spring system would be possible.

What I claim is:

1. An adjustable handlebar, comprising:

two end pieces, including respective hand grip portions;

a central body which is formed of two separate, elongate substantially parallel plates, having respective end regions; and two pairs of clamping blocks, said end pieces being clamped between said respective end regions of the parallel plates forming the central body so as to extend in longitudinal alignment with said end regions, clamping of said end pieces being effected by means of the respective pairs of clamping blocks which are configured such that pivotable adjustment of said end pieces relative to said parallel plates is not possible.

2. A handlebar as set forth in claim 1, wherein each end piece has a proximal portion connected to said central body, and a distal portion remote from said central body, each proximal portion has an axis, and each end piece is adjustable in position along the axis of its proximal portion.

3. A handlebar as set forth in claim 1, wherein each end piece has a proximal portion connected to said central body, and a distal portion remote from said central body, each proximal portion has an axis, and each end piece is capable of being rotationally adjusted about the axis of its proximal portion.

4. A handlebar as set forth in claim 1, wherein said end pieces are releasably attached to said central body.

5. A handlebar as set forth in claim 1, wherein said plates forming said central body are of substantially identical shape and size.

6. A handlebar as set forth in claim 1, wherein said plates forming said central body have their respective end regions curved to one side in the respective planes of said plates.

7. A handlebar as set forth in claim 1, wherein said end pieces are bent at an oblique angle at a position intermediate to their ends.

8. A handlebar as set forth in claim 1, further including at least one element extending between said parallel plates, said element extending substantially perpendicular to said plates and said plates having recesses or openings into which said element projects.

9. A handlebar assembly, comprising a handlebar as set forth in claim 1 together with at least one clamping plate extending between said parallel plates forming said central body of the handlebar and together with a top yoke, to which the or each said clamping plate is connectable, the yoke itself being adapted for connecting to a motorcycle or cycle frame.

10. An assembly as set forth in claim 9, further including means for fastening the handlebar to the top yoke and springing and vibration damping means associated therewith.

11. An assembly as set forth in claim 9, wherein notches are formed in the edges of said parallel plates and notches are formed at corresponding positions in said clamping plates, and wherein at least two pins extend between said parallel plates, said pins extending substantially perpendicularly to said plates, ends of the pins located in the respective notches, and being clamped in position by the said clamping plates.

12. A handlebar assembly, comprising:

a handlebar which comprises two end pieces, including respective handgrip portions, and a central body which is formed of two separate, elongate substantially parallel plates, having respective end regions, the end pieces being non-pivotably clamped between said respective end regions of the parallel plate forming the central body;

at least one clamping plate extending between said parallel plates forming said central body of the handlebar and together with a top yoke, to which the or each said clamping plate is connectable, the yoke itself being adapted for connecting to a motorcycle or cycle frame;

means for fastening the handlebar to the top yoke; and springing and vibration damping means associated therewith, said springing and vibration damping means comprises a cylindrical housing within which a plurality of resilient material rings are stacked, and wherein said fastening means takes the form of a bolt extending through said rings.

13. An assembly as set forth in claim 12, wherein said springing and vibration damping means additionally comprises at least one annular element mounted within said housing and carrying a plurality of resilient material inserts arrayed around it circumference.

14. An assembly as set forth in claim 13, wherein characteristics of said springing and vibration damping means are adjustable by rotation of said at least one annular element.

* * * * *